US010735974B2

(12) United States Patent
Worrall et al.

(10) Patent No.: US 10,735,974 B2
(45) Date of Patent: Aug. 4, 2020

(54) SYNCHRONISING RADIO CONFIGURATION PARAMETERS

(71) Applicant: Alcatel Lucent, Boulogne Billancourt (FR)

(72) Inventors: Chandrika K. Worrall, Newbury (GB); Sudeep K. Palat, Swindon (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/910,732

(22) PCT Filed: Jul. 21, 2014

(86) PCT No.: PCT/EP2014/001994
§ 371 (c)(1),
(2) Date: Feb. 8, 2016

(87) PCT Pub. No.: WO2015/018492
PCT Pub. Date: Feb. 12, 2015

(65) Prior Publication Data
US 2016/0198346 A1    Jul. 7, 2016

(30) Foreign Application Priority Data

Aug. 9, 2013    (EP) .................................... 13360017

(51) Int. Cl.
*H04W 16/18*         (2009.01)
*H04W 24/02*         (2009.01)
(Continued)

(52) U.S. Cl.
CPC ........... *H04W 16/18* (2013.01); *H04W 24/02* (2013.01); *H04W 28/08* (2013.01); *H04W 76/15* (2018.02); *H04W 88/06* (2013.01)

(58) Field of Classification Search
CPC ..... H04W 16/18; H04W 76/15; H04W 28/08; H04W 88/06
See application file for complete search history.

(56) References Cited

U.S. PATENT DOCUMENTS

2010/0111047 A1    5/2010  Yang
2010/0157906 A1*   6/2010  Yang ................... H04W 56/001
                                                       370/328
(Continued)

FOREIGN PATENT DOCUMENTS

CN        102348226         2/2012
EP        1 971 174 A2      9/2008
(Continued)

OTHER PUBLICATIONS

International Search Report for PCT/EP2014/001994 dated Oct. 28, 2014.
(Continued)

*Primary Examiner* — Mazda Sabouri
(74) *Attorney, Agent, or Firm* — Fay Sharpe LLP

(57) ABSTRACT

A method, in a radio communication system, for synchronising radio configuration parameters between user equipment in dual connectivity using a first set of parameters with a primary node and a secondary node of the system, comprising: transmitting a set of radio configuration parameters from the secondary node to the UE; transmitting a synchronisation request from the user equipment to the secondary node for the set of updated parameters; and applying the set of updated parameters, if any.

15 Claims, 3 Drawing Sheets

(51) Int. Cl.
H04W 76/15 (2018.01)
H04W 28/08 (2009.01)
H04W 88/06 (2009.01)

(56) References Cited

U.S. PATENT DOCUMENTS

| | | | | |
|---|---|---|---|---|
| 2013/0115958 A1* | 5/2013 | Wei | ........................ | H04L 5/0007 |
| | | | | 455/437 |
| 2013/0155903 A1* | 6/2013 | Bi | ......................... | H04B 7/024 |
| | | | | 370/255 |
| 2013/0235738 A1* | 9/2013 | Siomina | ................ | H04W 24/00 |
| | | | | 370/252 |
| 2014/0126545 A1* | 5/2014 | Tamura | ................. | H04W 36/30 |
| | | | | 370/332 |
| 2015/0282239 A1* | 10/2015 | Han | .................... | H04W 72/042 |
| | | | | 370/329 |
| 2016/0050652 A1* | 2/2016 | Wu | ......................... | H04L 5/001 |
| | | | | 370/329 |

FOREIGN PATENT DOCUMENTS

| | | |
|---|---|---|
| JP | 2009-239376 A | 10/2009 |
| WO | 2014/129120 A | 8/2014 |

OTHER PUBLICATIONS

Alcatel-Lucent, Discussion on the RRC protocol supporting dual connectivity[online], 3GPP TSG-Ran WG2#82, Internet <URL:http://www.3gpp.org/ftp/tsg_ran/WG2_RL2/TSGR2_82/Docs/R2-131962.zip>, May 24, 2013, R2-131962.

* cited by examiner

SYNCHRONISING RADIO CONFIGURATION PARAMETERS

TECHNICAL FIELD

The present invention relates to a method, in a radio communication system comprising a user equipment in dual connection with a primary node and a secondary node, a telecommunications system, a primary node, a secondary node and to a user equipment.

BACKGROUND

Small Cells are low power, low-cost base stations that are able to provide cellular service in residential or enterprise environments, with a typical coverage range of tens of metres. They have auto-configuration and self-optimization capabilities that enable a simple plug and play deployment, and are designed to automatically integrate themselves into an existing macrocellular network. Small cells, often referred to as pico cells, or metro cells, typically use a customer's broadband internet connection, for example DSL, cable or the like, as backhaul towards the macrocellular network. Support of non-ideal backhaul (with one way latency of few milliseconds to few tens of milliseconds) between small cells and between small cell and macro cells is considered as the typical deployment scenario.

Small cell deployment for handling capacity needs in high traffic areas, such as hot spot areas, is an area of investigation. A proposal for handling capacity needs in high traffic areas is to provide dual connectivity support for user equipment. Dual connectivity support allows a User Equipment (UE) to be concurrently connected to a macro cell and a small cell, or to two small cells for example. A UE can thus be connected to and served by more than one cell at a time. Dual connectivity support is considered as a way to enable offloading of traffic when required.

SUMMARY

According to an example, there is provided a method, in a radio communication system, for synchronising radio configuration parameters between user equipment in dual connectivity using a first set of parameters with a primary node and a secondary node of the system, comprising transmitting a set of radio configuration parameters from the secondary node to the UE, transmitting a synchronisation request from the user equipment to the secondary node for the set of updated parameters; and applying the set of updated parameters, if any. The synchronisation request can be a request transmitted using a random-access channel of the system. The set of updated parameters can be applied for use with communication between the user equipment and the secondary node after the completion of the random access procedure for parameter synchronisation. Data communication on unmodified bearers continues during parameter synchronisation for modified bearers. Otherwise, data communication on unmodified bearers is suspended during parameter synchronisation for modified bearers. The set of radio configuration parameters can be transmitted directly from the secondary node to the UE, or via the primary node.

Communication between the user equipment and the secondary node can continue using the first set of parameters after the updated parameters are transmitted to the primary node of the system. The set of updated parameters can be applied for use with communication between the user equipment and the secondary node after a preselected period of time has passed following transmission of the set of updated parameters. Data communication on unmodified bearers can continue during parameter synchronisation for modified bearers. Otherwise, data communication on unmodified bearers is suspended during parameter synchronisation for modified bearers.

According to an example, there is provided a radio telecommunication system comprising a primary node, a secondary node, a UE in dual connectivity using a first set of parameters with the primary node and the secondary node of the system, the system operable to transmit a set of radio configuration parameters from the secondary node to the UE; transmit a synchronisation request from the user equipment to the secondary node for the set of updated parameters; and apply the set of updated parameters, if any. The synchronisation request can be a request transmitted using a random-access channel of the system. Communication between the user equipment and the secondary node can continue using the first set of parameters after the updated parameters are transmitted to the primary node of the system. The set of updated parameters can be applied for use with communication between the user equipment and the secondary node after a preselected period of time has passed following transmission of the set of updated parameters. Data communication on unmodified bearers can continue during parameter synchronisation for modified bearers According to an example, there is provided a primary node of a radio telecommunication system as provided above, operable in a dual connectivity link with a UE. According to an example, there is provided a secondary node of a radio telecommunication system as provided above, operable in a dual connectivity link with a UE.

According to an example, there is provided a UE in dual connectivity with a primary node and a secondary node of a system as provided above. According to an example, there is provided a UE in dual connectivity with a primary node and a secondary node of a system, the UE operable in accordance with a method as provided above.

According to an example, there is provided a node of a radio telecommunication system operable to transmit a set of radio configuration parameters to user equipment (UE) in dual connectivity with a primary node of the system and the node, receive a synchronisation request from the UE for the set of updated parameters.

BRIEF DESCRIPTION OF THE DRAWINGS

Embodiments will now be described, by way of example only, with reference to the accompanying drawings, in which.

DETAILED DESCRIPTION

Figure 1:
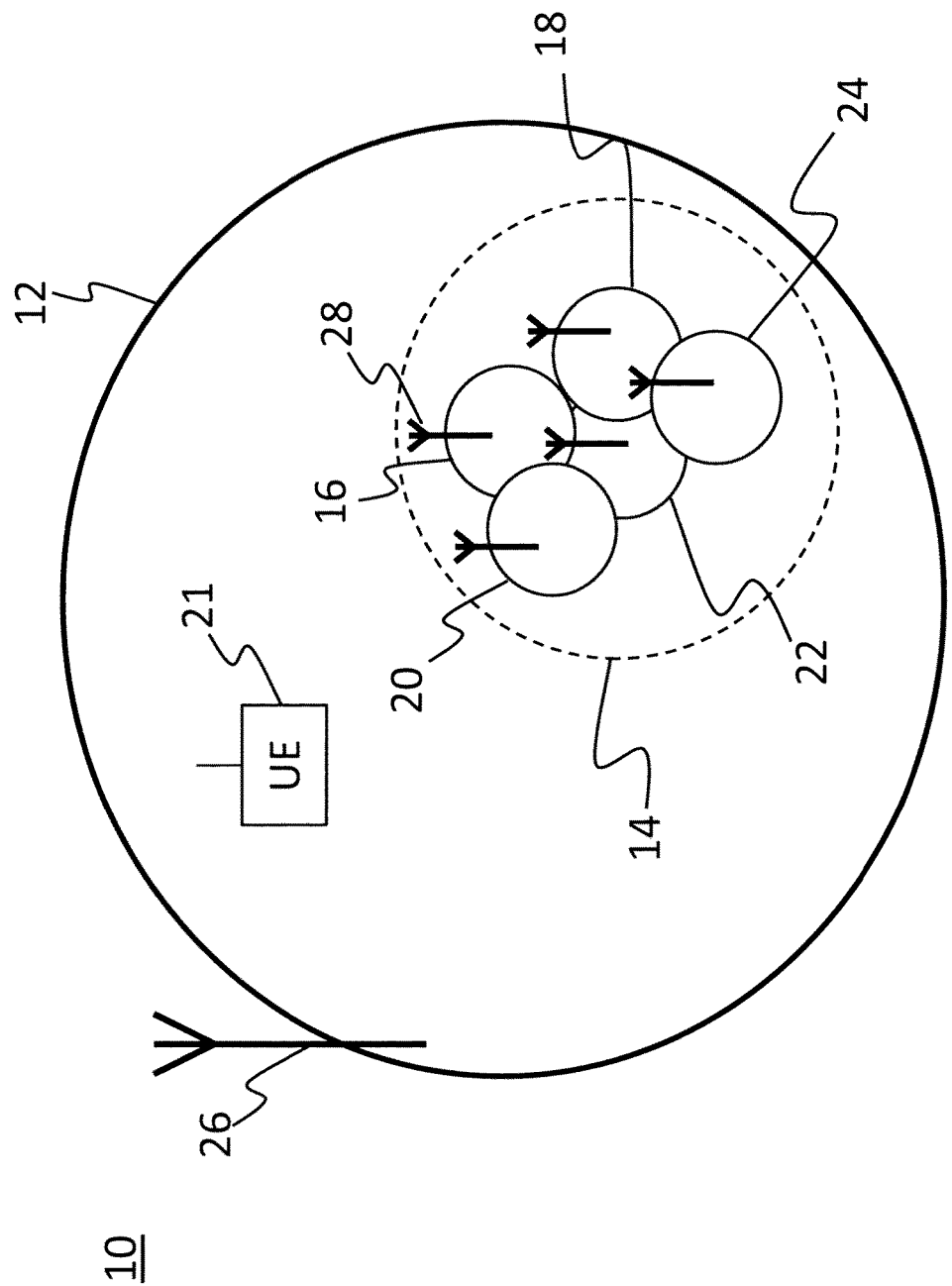
FIG. 1 is a schematic representation of a heterogeneous telecommunications system comprising a macro cell and a cluster of small cells.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

FIG. 1 is a schematic representation of a heterogeneous telecommunications system 10 comprising a macro cell 12 and a cluster of small cells 14. The cell 12 and respective ones of the cells in the cluster of small cells 14 are served by E-UTRAN Node Bs, also known as Evolved Node Bs (herein "eNB", also interchangeably referred to as "nodes") which form the hardware that is connected to the radio communication network that communicates directly with mobile handsets, known as user equipment (UE).

The cluster of small cells 14 comprises a first small cell 16, a second small cell 18, a third small cell 20, a fourth small cell 22 and a fifth small cell 24. The small cells are distributed geographically to provide an area of coverage within the macro cell 12. UE 21 may roam through the network 10. When the user equipment is located within the macro cell 12, communications may be established between the user equipment and the macro cell base station 26 over an associated radio link. If the user equipment is located geographically within one of the small cells 16, 18, 20, 22 and 24, communications may be established between the user equipment and the base station of the associated small cell over an associated radio link. It will be appreciated that FIG. 1 shows only an example heterogeneous network and that a plurality of macro cells may be provided, more or less than five small cells may be provided and a plurality of small cell clusters may be provided.

As described above, within the macro cell 12, there is provided multiple small cell base stations which provide a plurality of small cells 16, 18, 20, 22, and 24. The small cells provide local communications coverage for a user in their vicinity. As a user equipment comes within range of a small cell, such as the first small cell 16, a handover may occur between the base station 26 of the macro cell and the base station 28 of the small cell, such as when the base station of the small cell detects that user equipment has come within range. Likewise, as a user equipment comes within range of a different small cell, a handover may occur between the base station of the current small cell and the base station of the new small cell when the base station of the new small cell detects that user equipment has come within range.

In order to handle the capacity needs of a high traffic area, a user equipment in the telecommunications network 10 of FIG. 1 may be provided with dual connectivity support. That is, user equipment may be connected to both the macro cell 12 and the small cell 16. Also, it should be appreciated that a user equipment may be dual connected to small cell 16 and any of the other small cells 18 to 24.

According to an example, parameter synchronization between a small cell and a UE is provided, therefore preventing the situation in which a UE may apply new parameters while the network is using older parameters after reconfiguration or parameter modification, thereby causing communication between the UE and the small cell to be unsuccessful.

In an example, Random Access Channel (RACH) based synchronization can be used. For example, after receiving a new set of radio configuration parameters, a UE can perform a RACH prior to applying new parameters. Both dedicated preamble based and contention based RACH can be used for parameter synchronization according to an example. Accordingly, RACH can be used as a method of radio parameter synchronization between a small cell eNB and a UE.

Additionally, the physical random access resources to be used for the dedicated preamble transmission can be provided to the UE for scheduled transmission together with the updated configuration parameters.

Figure 2:
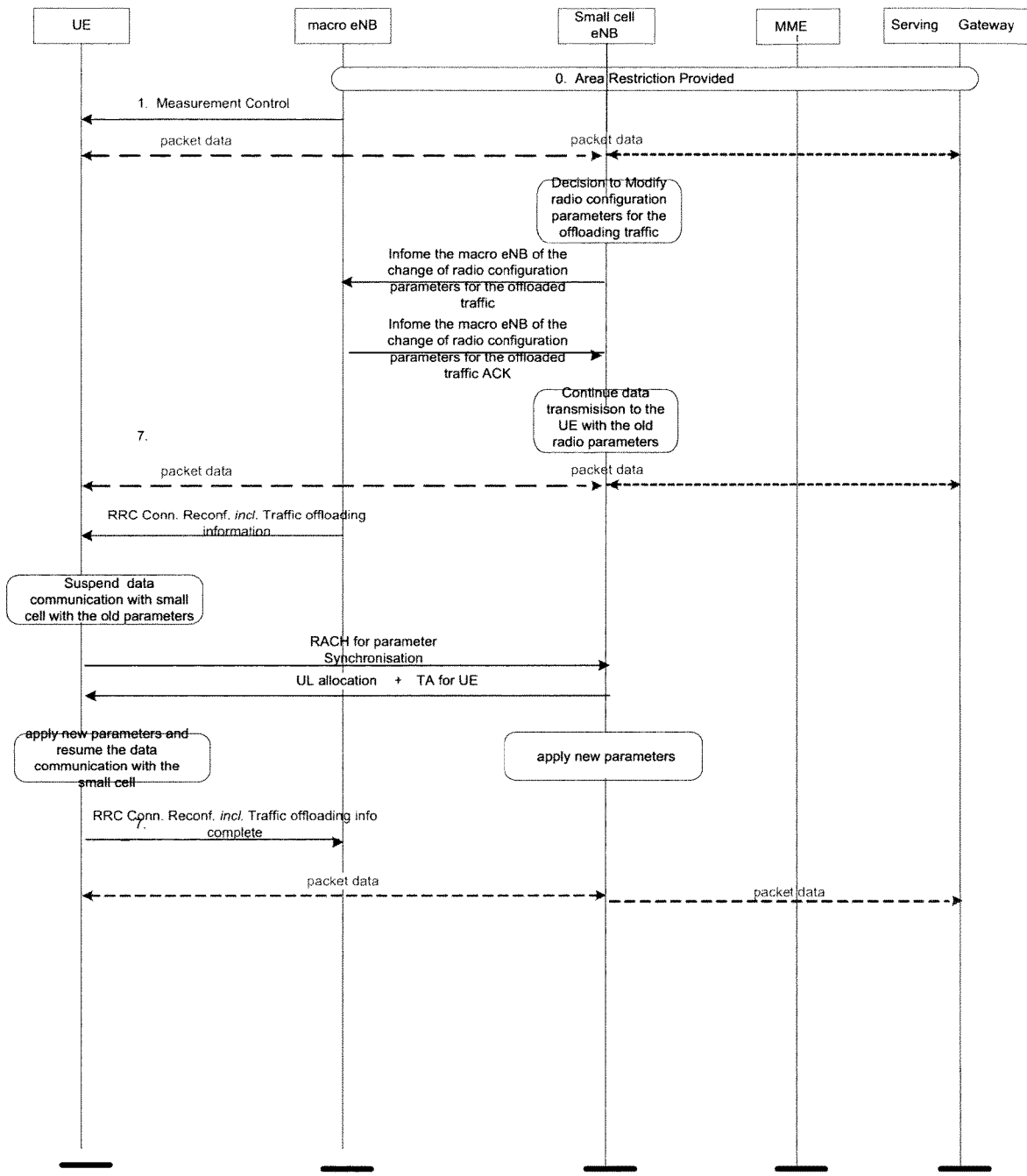
FIG. 2 is a schematic representation of an embodiment in which a dedicated preamble is used for parameter synchronization purposes.

FIG. 2 is a schematic representation of an embodiment in which a dedicated preamble is used for parameter synchronization purposes. A small cell eNB informs the macro cell eNB of the radio parameter modification for the offloading traffic. The small cell allocates a dedicated preamble for the use of parameter synchronization and forwards the allocated preamble information to the macro eNB. The macro eNB sends a message ACK to the small cell eNB.

Even after the small cell eNB made the decision to modify the radio configuration, the small cell eNB continues communication to the UE using the old radio configuration.

The macro eNB sends the new radio configuration parameters to the UE using an RRC connection reconfiguration message. The macro eNB may generate the message using the information provided by the small cell or the small cell may provide the message to the macro eNB in a transparent container, thus the macro eNB can forward the message to the UE. Upon reception of the RRC connection reconfiguration message, the UE suspends the communication to the small cell for modified bearers using old parameters.

In an embodiment, data communication on unmodified bearers is not impacted and continues during the parameter synchronization for the modified bearers. The UE performs the random access using the allocated dedicated preamble. The dedicated preamble is seen as the UE identification and the cause for parameter synchronization by the small cell and the UE. Upon reception of the dedicated preamble, the small cell sends a Random Access Response (RAR) message to the UE. With completion of the RA procedure, the UE and the small cell apply the new radio parameters and resume communication.

Figure 3:
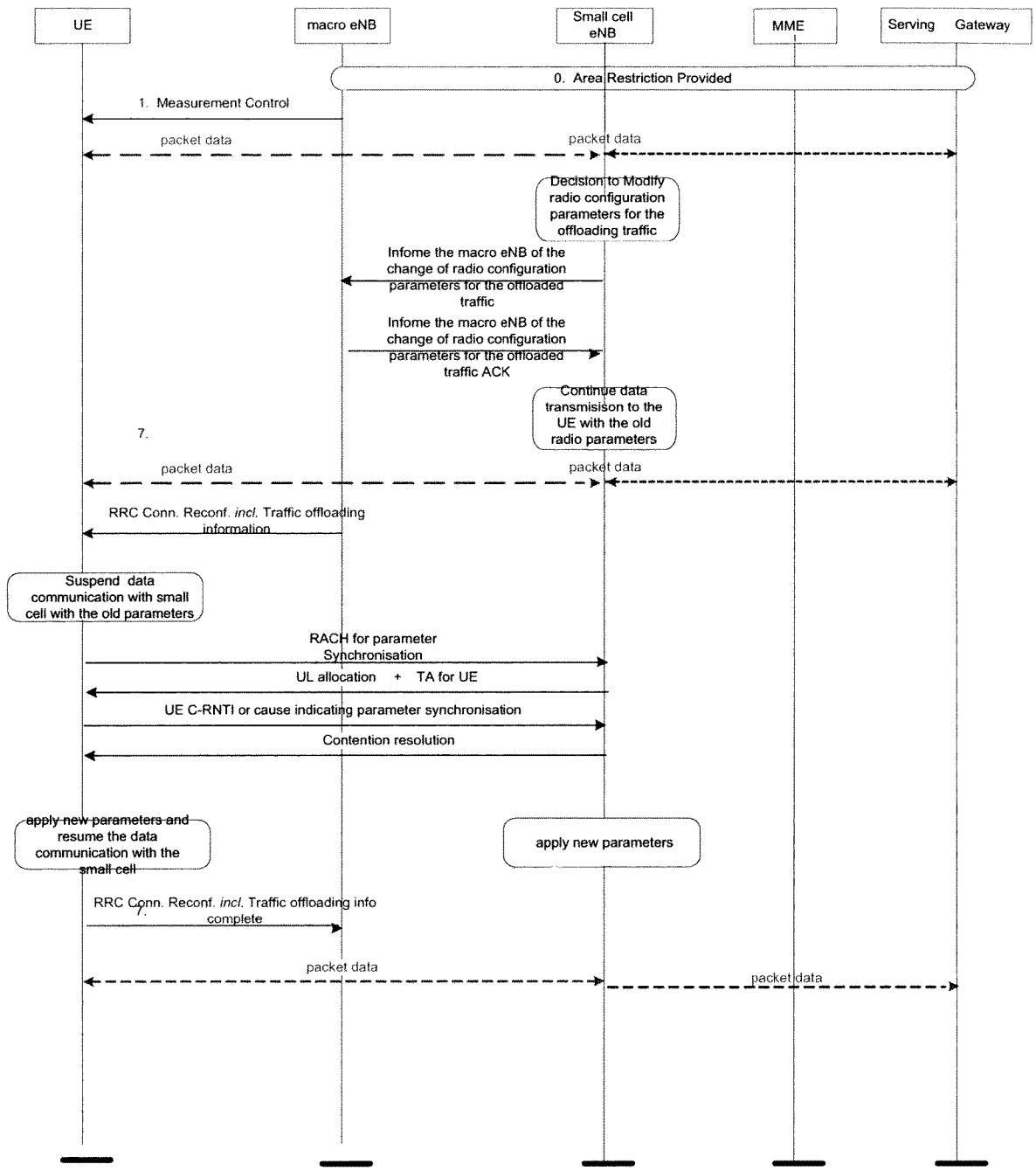
FIG. 3 is a schematic representation showing a process for parameter synchronisation using a contention based preamble.

FIG. 3 is a schematic representation showing a process for parameter synchronisation using a contention based preamble. In this scenario, the small cell does not allocate a dedicated preamble for the use of parameter synchronisation to the UE. Upon reception of the RRC connection reconfiguration including new parameters for offloading bearers, the UE suspends the modified offloading bearers and applies a contention based random access to the small cell. After receiving the RA response, the UE sends the C-RNTI and an indication of parameter synchronisation (such as a new cause value for example) to the small cell. The message is used to identify the UE and the reason for the random access. Upon the completion of the RACH procedure the UE and the small cell resume the data communication on the modified bearers using the new parameters.

The invention claimed is:

1. A method, in a radio communication system, for updating radio configuration parameters for communications with a user equipment that is using a first set of radio configuration parameters, the user equipment being in dual connectivity with a primary node and a secondary node of the system, the method comprising:
transmitting a set of updated radio configuration parameters from the secondary node to the user equipment via the primary node in an RRC connection reconfiguration message from the primary node to the user equipment;
transmitting a synchronization request from the user equipment to the secondary node to apply the set of updated radio configuration parameters to a data communication between the user equipment and the secondary node, and transmitting an RRC connection reconfiguration complete message from the user equipment to the primary node; and
applying the set of updated radio configuration parameters at the secondary node and the user equipment after completion of a synchronization procedure in response to transmission of the synchronization request;
wherein the synchronization request is a request transmitted using a random-access channel of the system; and
wherein data communication on unmodified bearers continues between the user equipment and the secondary node during parameter synchronization for modified bearers,
wherein communication between the user equipment and the secondary node continues using the first set of parameters after the updated parameters are transmitted to the primary node of the system,
wherein transmission of the RRC connection reconfiguration complete message occurs after the synchronization request.

2. The method as claimed in claim 1, wherein the set of updated radio configuration parameters is applied after a preselected period of time has passed following transmission of the set of updated radio configuration parameters.

3. A radio telecommunication system comprising:
a primary node;
a secondary node;
a user equipment in dual connectivity with the primary node and the secondary node using a first set of radio configuration parameters, the system being configured to:
transmit a set of updated radio configuration parameters from the secondary node to the user equipment via the primary node in an RRC connection reconfiguration message from the primary node to the user equipment;
transmit a synchronization request from the user equipment to the secondary node to apply the set of updated radio configuration parameters to a data communication between the user equipment and the secondary node, and transmit an RRC connection reconfiguration complete message from the user equipment to the primary node;
apply the set of updated parameters at the secondary node and the user equipment after completion of a synchronization procedure in response to transmission of the synchronization request; and
continue data communication on unmodified bearers between the user equipment and the secondary node during parameter synchronization for modified bearers;
wherein the synchronization request is a request transmitted using a random-access channel of the system
wherein communication between the user equipment and the secondary node continues using the first set of parameters after the updated parameters are transmitted to the primary node of the system,
wherein transmission of the RRC connection reconfiguration complete message occurs after the synchronization request.

4. The system as claimed in claim 3, wherein the set of updated radio configuration parameters is applied after a preselected period of time has passed following transmission of the set of updated radio configuration parameters.

5. A secondary node of a radio telecommunication system, the radio telecommunication system further comprising:
a primary node and user equipment in dual connectivity with the primary node and the secondary node using a first set of radio configuration parameters;
the secondary node comprising a processor and memory with executable instructions, the memory and executable instructions being configured to, with the processor, cause the secondary node to:
transmit a set of updated radio configuration parameters to the user equipment via the primary node in an RRC connection reconfiguration message from the primary node to the user equipment;
receive a synchronization request from the user equipment before the user equipment transmits an RRC connection reconfiguration complete message to the primary node;
apply the set of updated radio configuration parameters to a data communication between the user equipment and the secondary node after completion of a synchronization procedure in response to receipt of the synchronization request; and
continue data communication on unmodified bearers between the user equipment and the secondary node during parameter synchronization for modified bearers;
wherein the synchronization request is a request transmitted using a random-access channel of the system,
wherein communication between the user equipment and the secondary node continues using the first set of parameters after the updated parameters are transmitted to the primary node of the system,
wherein transmission of the RRC connection reconfiguration complete message occurs after the synchronization request.

6. User equipment in dual connectivity with a primary node and a secondary node of a radio telecommunication system using a first set of radio configuration parameters, the user equipment comprising a processor and memory with executable instructions, the memory and executable instructions being configured to, with the processor, cause the user equipment to:
receive a set of updated radio configuration parameters from the secondary node via the primary node in an RRC connection reconfiguration message from the primary node to the user equipment;

transmit a synchronization request to the secondary node and an RRC connection reconfiguration complete message to the primary node;

apply the set of updated parameters to a data communication between the user equipment and the secondary node after completion of a synchronization procedure in response to transmission of the synchronization request; and continue data communication on unmodified bearers between the user equipment and the secondary node during parameter synchronization for modified bearers;

wherein the synchronization request is a request transmitted using a random-access channel of the system, wherein communication between the user equipment and the secondary node continues using the first set of parameters after the updated parameters are transmitted to the primary node of the system, wherein transmission of the RRC connection reconfiguration complete message occurs after the synchronization request.

7. The secondary node as claimed in claim 5, the secondary node being configured to apply the set of updated radio configuration parameters after a preselected period of time has passed following transmission of the set of updated radio configuration parameters.

8. The method of claim 1, wherein secondary node is a small cell, and the primary node is a macro Evolved Node B (eNB).

9. The system of claim 3, wherein secondary node is a small cell, and the primary node is a macro Evolved Node B (eNB).

10. The secondary node of claim 5, wherein secondary node is a small cell.

11. The user equipment of claim 6, wherein secondary node is a small cell, and the primary node is a macro Evolved Node B (eNB).

12. The method of claim 1, wherein the secondary node sends the message to the primary node in a transparent container, and the primary node forwards the message to the user equipment.

13. The system of claim 3, wherein:
the secondary node is configured to send the message to the primary node in a transparent container; and
the primary node is configured to forward the message to the user equipment.

14. The secondary node of claim 5, wherein the secondary node is further configured to send the message to the primary node in a transparent container.

15. The user equipment of claim 6, wherein the user equipment is further configured to receive the RRC connection reconfiguration message from the primary node via the secondary node sending the message to the primary node in a transparent container.

* * * * *